United States Patent [19]
Watanabe et al.

[11] Patent Number: 4,895,555
[45] Date of Patent: Jan. 23, 1990

[54] POWER TRANSMISSION BELT AND METHOD OF MANUFACTURE

[75] Inventors: Katuki Watanabe; Mamoru Minamimure, both of Kobe, Japan

[73] Assignee: Bando Chemical Industries, Ltd., Kobe, Japan

[21] Appl. No.: 173,639

[22] Filed: Mar. 25, 1988

[30] Foreign Application Priority Data

Mar. 31, 1987 [JP]  Japan ................. 62-80351

[51] Int. Cl.$^4$ .............................. F16G 1/10
[52] U.S. Cl. .................... 474/260; 474/263
[58] Field of Search ................... 474/260–268, 474/205; 428/295, 284, 902; 156/137–142

[56] References Cited

U.S. PATENT DOCUMENTS 3,404,578 10/1968 Koch et al. ............... 474/263

FOREIGN PATENT DOCUMENTS 0176686  7/1985 European Pat. Off. .
2359216 11/1973 Fed. Rep. of Germany .
55-132441  4/1979 Japan .
57-149646 12/1982 Japan .
58-038187  2/1983 Japan .
0091947  6/1983 Japan .................. 474/205
61-286637  5/1987 Japan .

Primary Examiner—Thuy M. Bui
Attorney, Agent, or Firm—Wenderoth, Lind & Ponack

[57] ABSTRACT

In raw-edge power transmission belts the tensile cords is covered with a thinly compressed layer composed of nonwoven fabric and elastomer matrix permeated therethrough at the tooth bottoms, and the nonwoven fabric is diffusedly mixed for reinforcing an elastomer matrix in the tooth parts.

In the method of manufacture, the outer cylindrical circumference of the internal die along which toothed faces are formed are covered with nonwoven fabric under non pressure, and the tensile cords are wound spirally. Hereafter, dies are set up and elastomer material is injected and hardened. A transmission belt is drived by slicing roundly a cylindrically shaped body derived in these processes.

4 Claims, 6 Drawing Sheets

POWER TRANSMISSION BELT AND METHOD OF MANUFACTURE

BACKGROUND OF THE INVENTION

1. Field of the Invention

This invention relates to a power transmission belt and its manufacturing process, and in more detail to improvements to a power transmission belt the matrix of which is made of an elastomer material such as low viscous liquefied urethane and the like, and the method of manufacture.

2. Description of the Prior Art

As conventionally used, power transmission belts of a small size and lightweight are well-known as, for example, a timing belt and a cog belt composed of elastomer material such as urethane.

Since the matrixes of these kinds of belts are made of liquefied elastomer material having a low viscosity so as to permeate through a covering fabric, it is extremely difficult to form a belt having a tooth part surface covering layer which can be derived by the manufacturing process of pressurizing the teeth part using lightly viscous elastomer material.

Namely, when forming toothed faces of a belt by injecting fabric for covering the toothed face with elastomer material in the grooves of an internal die, thus forming tooth parts of the belt under a compressive force, it is hard to forma layer for covering tooth parts since the liquefied elastomer material permeates through the fabric layer.

In addition, when the belt is formed by the abovementioned process, there occurs a problem of high costing caused by the need of non permeation-proof treatment of the covering fabric.

Therefore, a power transmission belt having a tooth part, such as a timing belt, a cog belt and the like, is formed by using liquefied elastomer material with low viscosity and is generally a raw edge belt, which does not provide a covering fabric.

However, in a power transmission belt with a raw edge, as shown in Fig.7A and Fig.7B, tensile cords (b) embedded in a belt (a) are exposed at tooth bases (c). Therefore, in regard to the timing belt (Fig.7A) there may occur wearing or breakage resulting from contact of the tensile cords with top faces (not shown) of a toothed pulley, so there is a problem in that a long usable life can not be derived.

In a cog belt (Fig.7B) trained to a V-pulley, there is also a problem in that slip easily occurs due to insufficient strength under lateral pressure when a high load is applied, and a permanent deformation may occur.

In the raw-edge belt, particularly in the timing belt where tensile cords (b) may directly contact toothed pulleys, a composition protecting the tensile cords is required.

Thus, in the timing belt as shown in FIG. 8A and FIG. 8B it is proposed and put into practical use to provide an elastomer layer (d) at the tooth bases (c) for protecting the tensile cords (b). (For example, Japanese Specification No. 58-38187)

However, in any timing belt (a) composed as shown in FIG. 8A and FIG. 8B, dimpled striae (e) remain on the elastomer layer (d) as an impression of ribs (not shown) provided on top faces of an internal die used to embed the tensile cords (b) into the elastomer layer (d) during the manufacturing process. Therefore, there is a problem in that cracks may be formed resulting from the stress concentration at these dimpled striae (e) under certain conditions.

On the other hand, a belt intermixed with high strength short fabrics in the elastomer matrix is disclosed in Japanese Sepcification No. 55-132441 as a power transmission belt which is composed to prevent the formation of cracks with reinforced tooth parts.

Nevertheless, even in the elastomer matrix intermixed with short fabrics, dimpled striae (e) would still exist on the surface of the tooth bases as shown in FIG. 8A or FIG. 8B since the ribs of the top faces are needed for the manufacturing process, still leaving the problem basically unsolved.

Moreover, the nonwoven fabric layer seems to be easily formable near the surface of the timing belt, yet it cannot be in practical use, because in that case the abovementioned non permeation-proof treatment for elastomer material is required in the nonwoven fabric layer.

In the case of the cog belt, the abovementioned composition for protecting the tensile cords (b) is not particularly required since there are not so many problems as in the timing belt. However, improvement of its strength under anti-lateral pressure is needed, especially for a small sized and lightweight transmission device.

SUMMARY OF THE INVENTION

In view of the abovementioned problems, objects of this invention are to derive a power transmission belt with a sufficient durable strength under any condition, keeping the tensile cords embedded entirely in the belt body without being exposing them at the tooth bases, and to derive the method of manufacture where such a belt can be easily formed.

In order to attain these objects, the power transmission belt in this invention comprises an endless belt body composed of an elastomer matrix, wherein tooth parts are formed so as to be convex and tooth bottoms are formed therebetween on an inner circumference of the belt.

The tensile cords are embedded therein extending longitudinally along a pitch line near the tooth bottoms and at the inside of tooth parts in the belt body to reinforce the belt body.

A nonwoven fabric composed of high strength fiber is also embedded between the inner circumferential face and the tensile cords in the belt body.

Under the tooth bottoms, the nonwoven fabric forms a compressed layer with elastomer matrix permeated therethrough so as to cover the tensile cords and protect them.

On the inside of the tooth parts the nonwoven fabric is distributed evenly diffusedly under non pressure, and longitudinally continuously in the compressed layer to reinforce the tooth parts under shearing stress.

In manufacturing the power transmission belt of this invention, the top faces of the internal die are covered with a bulky nonwoven fabric under non pressure. The tensile cords are then wound spirally over the nonwoven fabric along an outer cylindrical face of the internal die, compressing the nonwoven fabric to a predetermined thickness at the top faces.

The internal die is then put into the external die, the elastomer material forming the belt body is injected in a gap between the dies and allowed to hard therein, and a cylindrically shaped body derived after disconnecting the forming dies is circumferentially slided at predetermined widths.

BRIEF DESCRIPTION OF THE DRAWINGS

FIG. 1A and FIG. 1B are partially sectional views of power transmission belts according to this invention wherein FIG. 1A is for a timing belt and FIG. 1B is for a cog belt.

FIG. 2, FIG. 3 and FIG. 4 shows the manufacturing process of this invention, wherein FIG. 2 is a cross sectional view of a part of an internal die in the process of covering the internal die with the nonwoven fabric, Fig.3 is a partially sectional view of the part of the internal die in the process of winding the tensile cords and Fig.4 is a cross sectional view of the forming dies in the process of injecting elastomer material.

DESCRIPTION OF THE PREFERRED EMBODIMENTS

The power transmission belt according to this inventin comprises a belt body composed of an elastomer matrix, tensile cords, and a needle punched bulky nonwoven fabric, particularly utilizing the deforming characteristics in this nonwoven fabric under compressive stress.

Figure 1A:
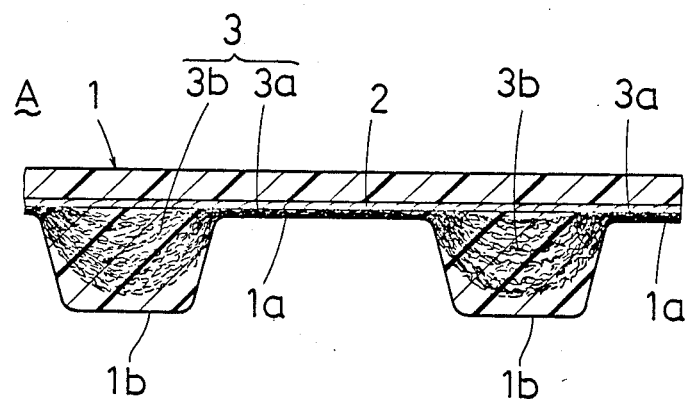
Figure 1B:
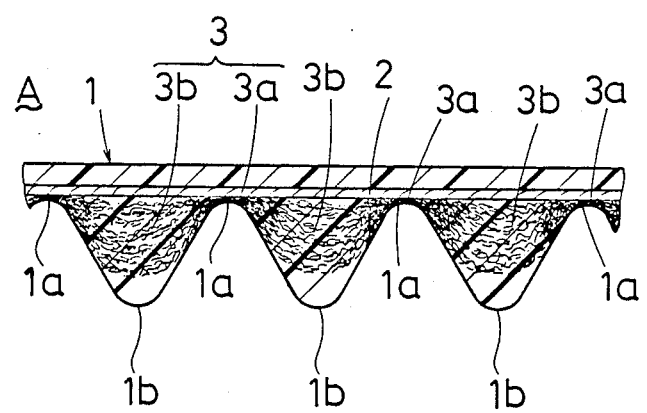

In the power transmission belt (A) of the Embodiment of this invention, a partial section of which is shown in FIG. 1A and FIG. 1B, corresponding to a timing belt and a cog belt formed so as to be endless, a plurality of tooth parts 1b are formed to be convex and a plurality of tooth bottoms 1a are formed therebetween on the inner circumference of a belt body 1 whose matrix is composed of an elastomer. In the belt body 1, tensile cords 2 are embedded extending longitudinally at a predetermined depth from the surface of the tooth bottoms 1a, and the circumference on which the tensile cords 2 extend is along a pitch line of the belt body 1. In the tooth bottoms 1a of the belt body 1, a compressed nonwoven fabric layer 3a consisting of a nonwoven fabric 3 and the elastomer matrix permeated therethrough is provided for perfectly covering the tensile cords 2, wherein the nonwoven fabric 3 is composed of high strength fiber 3b.

Since the tensile cords 2 are perfectly covered with the compressed nonwoven fabric layer 3a with elastomer matrix permeated therethrough at the tooth bottoms 1a of the belt body 1, the tensile cords 2 are perfectly protected from contact with the toothed pulley and friction in the case of a timing belt, and its strength under lateral pressure is increased in the case of a cog belt.

Also, the inside of the tooth parts 1b of the belt body 1 is substantially composed of an elastomer matrix wherein a fiber 3b of the bulky nonwoven fabric 3 continuing on said nonwoven fabric layer 3a is distributed evenly diffused and under no bias by the tensile cords. Therefore, this nonwoven fabric fiber 3b functions as elastomer reinforcing fiber at the tooth parts 1b and improves the shear strength of the tooth parts 1b.

Moreover, since the nonwoven fabric layer 3a with the elastomer material permeated therethrough at the tooth bottoms 1a is composed of the bulky nonwoven fabric 3 biased by the tensile cords 2, it can optionally be controlled in thickness by adjusting the bias force, namely, the PLD (pitch line difference) between the surface of the tooth bottoms 1a and the pitch line can be optionally adjustable.

Figure 2:
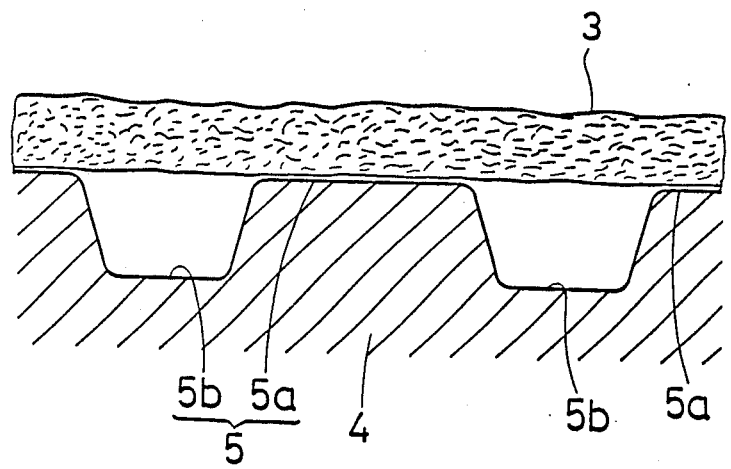
Figure 3:
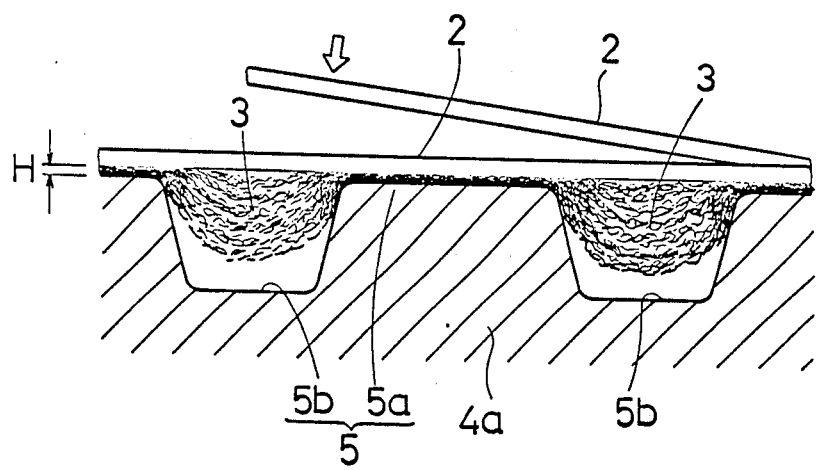
Figure 4:
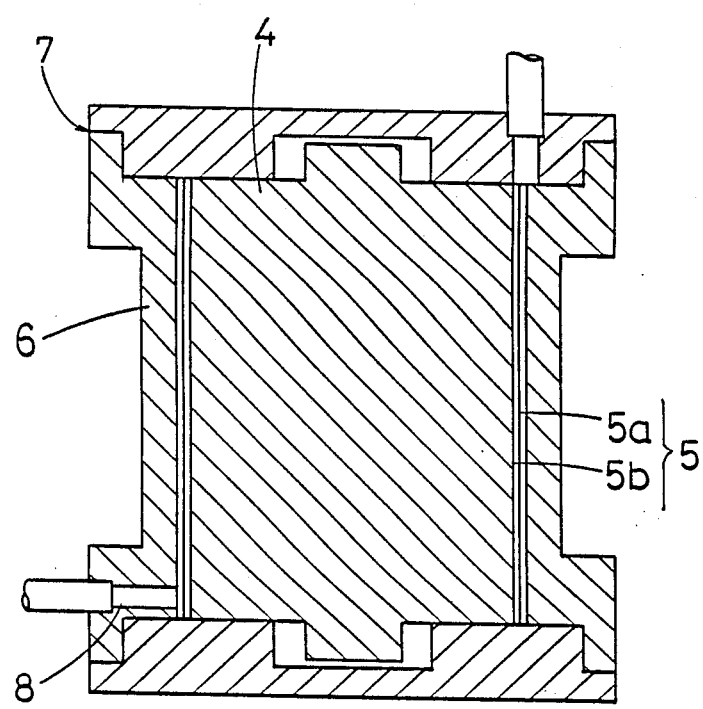

As shown in FIG. 2, FIG. 3 and FIG. 4, forming dies 7 adapted to manufacture the transmission belt are provided with a cylindrical internal die 4 and a cylindrical external die 6. The outer cylidrical circumferences of the internal die 4 is toothed to form a toothed face 5 and in this toothed face 5 a plurality of grooves 5b are adapted to form from the tooth parts 1b of the transmission belt and a plurality of top faces 5a are adapted to form the tooth bottoms 1a thereof. An inner periphery of the external die 6 is formed cylindrically so as to engage with the top faces 5a of the internal die 4 with a certain gap.

In the manufacturing process, as shown in FIG. 2, the bulky nonwoven fabric 3 is placed on the toothed face 5 of the internal die 4 under no pressure. Hereafter, as shown in Fig.3, the tensile cords 2 are wound spirally thereover along the toothed face 5 so as to press thenonwoven fabric 3 in a predetermined thickness (H) at the tooth bottoms 1b. Then the nonwoven fabric 3 enters the grooves 5b of the internal die 4, urged by the tensile cords 2, and staying bulky with no pressure.

Therefore the bulky nonwoven fabric 3 is compressed on the top faces 5a of the internal die 4, while it is distributed "softly" under non pressure in the grooves 5b.

Also, while the compressed nonwoven fabric layer 3a is decreased to thickness H, compressed by the tensile cords 2, at the same time it acts as a spacer for separating the tensile cords 2 from the internal die 4.

The above mentioned internal die 4 is put into the external die 6 to set up a forming die 7 as shown in FIG. 4, and the liquefied elastomer material of low viscosity is injected from an injecting port 8. Then the elastomer material is smoothly permeated through the compressed and non pressured nonwoven fabric 3 in the gap of the forming dies 7 and an accurately toothed belt is formed along the shape of the top faces 5a and the grooves 5b of the internal die 4.

Then the elastomer material is hardened and hereafter the formign die 78 is disconnected, deriving a cylindrically shaped body of a power transmission belt. The power transmission belt (A) is obtained by slicing roundly through the cylindrical body with a predetermined width, as per the standard process.

Test examples of manufacturing process will now be explained below.

TEST EXAMPLE 1

A bulky polyester nonwoven fabric 3 whose weight per unit area is 70 gr/ m$^2$, and whose full thickness under non pressure is 1 mm was needle punched, and not done with adhesion treatment. The outer circumference of the internal die 4 for forming a timing belt, whose diameter was about 155 mm, was covered softly therewith so that almost no pressure was applied thereto. Then, the tensile cords 2 (made by Dupont Co., the trade name of which is "Kevlar") composed of aromatic polyamide were wound spirally thereon with a constant tension so that the nonwoven fabric 3 should be 0.1 mm in thickness H at the top faces 5a of the internal die 4 for forming the tooth bottoms 1a.

In this process, the nonwoven fabric 3 was, as shown in FIG. 3, compressed to be 0.1 mm in thickness on the top faces 5a and stuffed softly into the grooves 5b that are 1.2 mm in depth.

Next, this internal die 4 was put into the external die 6. Hereafter, liquefied polyurethane resin blended as shown below was injected by vacuum force under the standard process, and the cylinder shaped body for the timing belt was formed.

|  | Parts by weight |
|---|---|
| Prepolymer | 100 |
| Hardener (3,3'-dichloro-4,4'aminodiphenylmethane) | 13 |
| Plasticizer di-(2-ethylhexyl)sebacate(DOS) | 10 |
| Coloring Agent | 0.5 |

A plurality of ring-shaped timing belts 6mm in width, 486 mm in circumferencial length and 3mm in teeth pitch were cut therefrom by slicing roundly the above mentioned cylindrically shaped body.

This timing belt was composed so that at the tooth bottoms 1a the compressed nonwoven fabric layer 3a was formed with the polyurethane matrix permeated therethrough, covering the tensile cords 2 entirely. In addition, a short fiber 3b composing the nonwoven fabric 3 was distributed evenly diffusedly in an elastomer matrix of the tooth parts 1b, partly resolved under influence of a turbulent flow when injecting the liquefied material.

TEST EXAMPLE 2

A nonwoven fabric 3 the same as in Test Example 1 was wound softly around the outer circumference of the internal die 4 for forming a cog belt, whose diameter was about 155 mm, so that no pressure was applied thereto. Then, tensile cords 2 made of polyester 0.5 mm in diameter were wound sprially thereon with constant tension so that the nonwoven fabric 3 should be 0.1 mm in thickness H at the top faces 5a of the internal die 4.

In this process, the nonwoven fabric 3 was, as shown in FIG. 3, compressed to be 0.1 mm in thickness on the top faces 5a and stuffed softly into the grooves 5b, whose depth is 1.2 mm.

Next, this internal die 4 was put into the external die 6, and the liquefied polyurethane resin blended as in Example 1 was injected by vacuum force as per the standard process. A cylinder shaped body for the cog belt was formed.

By slicing roundly the above mentioned cylinder shpaed boyd of the cog belt, a plurality of cog belts of 6mm width and 488 mm circumference were cut out.

This cog belt was composed almost the smae as in Test Example 1, except for the difference of the shape of the tooth face.

PERFORMANCE TEST

The Performance Test results of the belts formed in Test Examples 1 and 2 are shown below.

Figure 5:
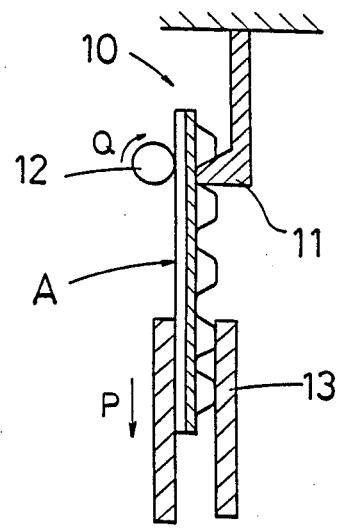
FIG. 5, FIG. 6A.

The shearing strength (kgf/1tooth) of tooth parts of three samples randomly taken out of the timing belts manufactured in Test Example 1 were measured with a shearing test instrument shown in FIG. 5, deriving the results shown in Table 1.

The test instrument 10, as shown in FIG. 5, uses a claw 11 engaged with tooth grooves of a belt and an internval keeping roll 12. The shear strength of the toothed power transmission belt (A) is measured by clipping the belt with clip 13 and pulling in the direction of an arrow P in the figure. The interval keeping roll 12 is rotated in the direction of an arrow Q in the figure.

TABLE 1

| Belts | Shear Strength (kgf/1 tooth) | | | |
|---|---|---|---|---|
| Sample No. | 1 | 2 | 3 | Average |
| TE 1 | 35.6 | 37.6 | 28.1 | 37.0 |
| C 1 | 24.8 | 28.2 | 25.3 | 26.1 |
| C 2 | 38.5 | 39.2 | 40.4 | 39.4 |

Figure 8A:
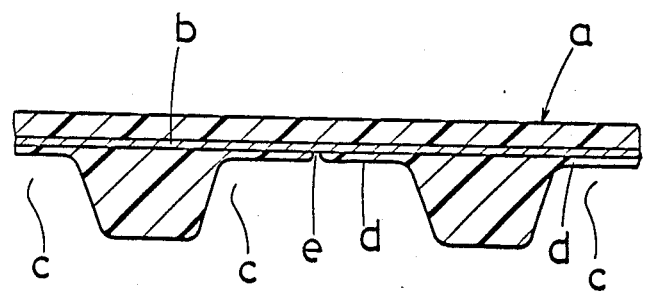
Figure 8B:
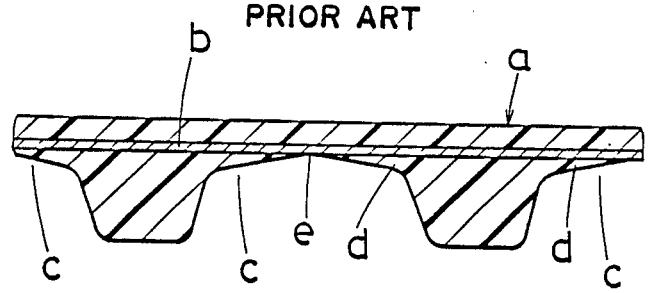

In the above table 1, the sample belts TE1 were ra-wedge timing belts manufactured in Test Example 1; the sample belts C1 were also raw-edge timing belts manufactured in a conventional process as shown in FIG. 8A and formed to have the same shape and dimensions as in Test Example 1; the sampel belts C2 were the timing belts having a fabric layer for covering tooth parts made of chloroprene rubber, manufactured in a conventional process and formed with the same dimensions as in Text Example 1.

Referring to the Table 1, it was confirmed that even the raw-edge belt derived in this invention obviously could be equal in shear strength to the conventional belt hvaing a fabric layer for covering surface.

Figure 6A:
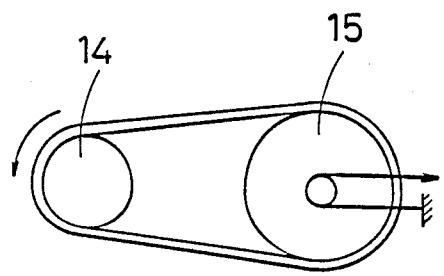

Next, the lift of the belts under real driven conditions was tested for the timing belts in Test Example 1, as shown in FIG. 6A. The belts were trained between a driving pulley 14 with twenty teeth and a driven pulley 15 with thirty-eight teeth, loaded with 950W on the driven pulley 15, and the driving pulley 14 was rotated at 10000 rpm. The results are shown in Table 2.

TABLE 2

| Belts | Life in a Driven Condition (hours) | | | |
|---|---|---|---|---|
| Sample No. | 1 | 2 | 3 | Average |
| TE 1 | 175.4 | 162.5 | 168.7 | 168.9 |
| C 1 | 69.3 | 75.8 | 80.4 | 75.2 |
| C 2 | 168.0 | 157.2 | 178.8 | 168.0 |

The sample belts C1, C2 in Table 2 are similar to those of Table 1.

The table shows clearly that the belts of the present inventionare also superior in driving ability.

Figure 6B:
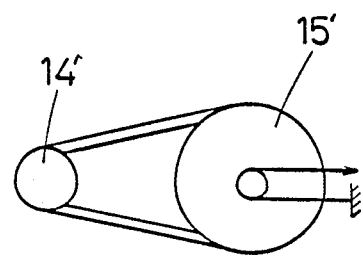
FIG. 6B are schematic illustrations of the test instruments for Embodiments.
Figure 7A:
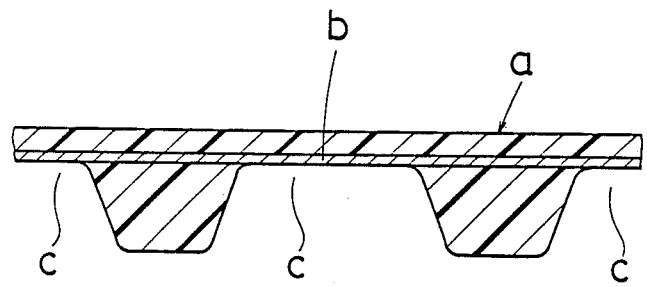
FIG. 7A, FIG. 7B and FIG. 8A, FIG. 8B are partially sectional views of conventional power transmission belts.
Figure 7B:
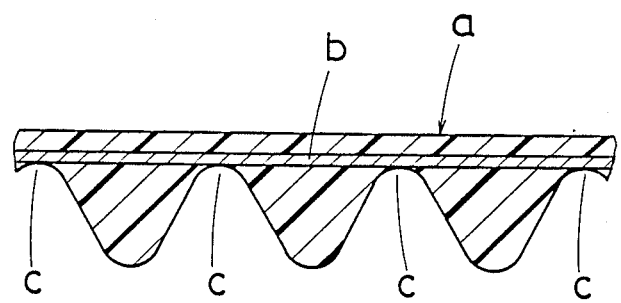

A usable life was tested for three samples randomly taken out of the cog belts in Test Example 2, as shown in Fig.6B. They were trained between a driving pulley 14° mm in diameter and a driven pulley 15' 40 mm in diameter, loaded with 160 W at the driven pulley and the driving pulley 14' was rotated at 500 rpm. The results are shown in Table 3.

TABLE 3

| Belts | Usable Life (Time units) | | | |
|---|---|---|---|---|
| Sample No. | 1 | 2 | 3 | Average |
| TE 2 | 107.0 | 116.2 | 121.4 | 115.0 |
| C 1 | 89.3 | 50.5 | 72.1 | 70.6 |

In this table, the sample belts in Test Example 2 were raw-edge belts; the sample belts C1 were also raw-edge cog belts derived by conventional manufacturing process. This table shows that the cog belts derived in this invention are superior tothe conventional belts.

EFFECTS OF THE INVENTION

In this invention as explained above, even in the raw-edge belt, which is not provided with a fabric layer for covering the surface at the toothed face, tensile cords 2 are entirely covered with elastomer material permeated therethrough, and the nonwoven fabric is mixed as reinforcing fiber into the elastomer matrix which is forming the tooth parts 1b, and thus breakage and fracture of the tensile cords can be surely prevented. In the cog belt, the strength under lateral pressure in the V-belt used for friction transmission and shear strength of the tooth parts are remarkably improved. Therefore, by this invention labor can be greatly saved in maintenance of a power transmission belt in small-sized transmission devices in which raw-edge belts are used.

According to the method of manufacture in this invention, the PLD of the tensile cords embedded in the power transmission belt is optionally adjustable without requiring other equipment, and the reinforced power transmission belt can be easily manufactured. As an additional advantage, the stress distribution of the toothed surface which effects rigity of the belt can be ideal; the density of the nonwoven fabric can be lowered toward the tooth top and raised toward the bottom base.

We claim:

1. A power transmission belt, comprising:
   an endless belt body made of an elastomer matrix and having an inner circumference;
   said endless belt body having a plurality of elastomer tooth portions and a plurality of elastomer tooth bottoms spaced along said inner circumference, each said tooth bottom separating two adjacent tooth protions of said plurality of tooth portions, and each said elastomer tooth portion having a free and uncovered elastomer surface along said inner circumference of said endless belt body;
   a plurality of tensile cords embedded in said endless belt body at a predetermined depth from the surface of said tooth bottoms; and
   a continuous nonwoven fabric made of high strength fiber embedded in said belt body between said tensile cords and the surfaces of said tooth bottoms and tooth portions, said fabric evenly distributed along the circumferential extent of said endless belt body such that said fabric is evenly diffused in said tooth portions and compressed in said tooth bottoms, said compressed fabric in said tooth bottoms providing a thin compressed layer protecting said tensile cords embedded in said endless belt body.

2. The power transmission belt as set forth in claim 1, wherein:

3. The power transmission belt as set forth in claim 1, wherein:
   each said tooth portion is substantially triangular in cross section.

4. The power transmission belt as set forth in claim 1, wherein:
   the amount of fabric per unit volume of elastomer is greater in said tooth bottoms than in said tooth portions.

* * * * *